Jan. 30, 1951 C. F. DINLEY 2,539,407
SOLVENT SAVER RECOVERY APPARATUS
Filed Feb. 21, 1947 8 Sheets-Sheet 1

FIG_1

WITNESSES
INVENTOR:
Clarence F. Dinley,
BY
ATTORNEYS.

Jan. 30, 1951 C. F. DINLEY 2,539,407
SOLVENT SAVER RECOVERY APPARATUS
Filed Feb. 21, 1947 8 Sheets-Sheet 3

FIG. 4.

INVENTOR:
Clarence F. Dinley
BY Paul & Paul
ATTORNEYS.

Jan. 30, 1951 C. F. DINLEY 2,539,407
SOLVENT SAVER RECOVERY APPARATUS
Filed Feb. 21, 1947 8 Sheets-Sheet 6

WITNESSES
Hubert Fuchs
George L. Comly

INVENTOR:
Clarence F. Dinley,
BY Paul & Paul
ATTORNEYS.

Jan. 30, 1951 C. F. DINLEY 2,539,407
SOLVENT SAVER RECOVERY APPARATUS
Filed Feb. 21, 1947 8 Sheets-Sheet 8

WITNESSES
Hubert Fuchs
George L. Comly

INVENTOR:
Clarence F. Dinley,
BY Paul & Paul
ATTORNEYS.

Patented Jan. 30, 1951

2,539,407

UNITED STATES PATENT OFFICE 2,539,407

SOLVENT SAVER RECOVERY APPARATUS

Clarence F. Dinley, Detroit, Mich., assignor to Detrex Corporation, Detroit, Mich., a corporation of Michigan Application February 21, 1947, Serial No. 730,179

8 Claims. (Cl. 34—74)

My invention relates to apparatus for the recovery of volatile solvents from clothes or textile materials that have been treated with such solvents, or from any article or material that absorbs, or adsorbs, or retains the solvent. The invention is particularly useful for recovering dry-cleaning solvents such as carbon tetrachloride, trichlorethylene, or perchlorethylene, whose vapors are generally uninflammable, or any other volatile grease-removing solvents. It also permits of freeing clothes or fabrics of solvent odor remaining after solvent in them has been recovered as far as practicable. My invention is basically similar in construction and operation to the apparatus shown in my issued U. S. Patent No. 2,310,680 but is directed to certain improvements thereon. These improvements over my earlier invention pertain to simplification of structure, rearrangement of operating elements with increased operating efficiency, and other features as will become apparent from the following detailed description of one form of my invention.

As in my issued patent referred to above, I have hereinafter described and explained my invention with particular reference to the dry-cleaning of clothes or the like. In dry-cleaning clothes with volatile solvents, the clothes are agitated in a bath of the solvent to remove grease and dirt, and are then rapidly spun or centrifuged to expel as much as possible of the solvent. While the greater part of the solvent used is gotten out of the clothes and recovered in this manner, a substantial amount still remains; and it is therefore a common practice to hang the clothes in a place where a good air circulation is maintained until they are free of all apparent odor of the solvent. In this way, the entire amount of solvent left in the clothes after centrifuging is lost, amounting, ordinarily, to some 10 to 20 lbs. of solvent per 100 pounds of woolen goods treated, and to some 20 to 45 lbs. of solvent per 100 pounds of cotton goods, according to the duration and speed, etc., of the centrifuging.

It is this solvent remaining in the clothes after the dry-cleaning operation that I aim to recover, by means of an improved apparatus which I have devised for the purpose. In suitable forms, such as here shown and described, my invention permits of recovering as much as some 95% of the solvent remaining in the clothes when treated in my apparatus. The apparatus can be made simple, convenient, rapid, and economical in operation, and very efficient in recovery of solvent, as well as rugged in construction and comparatively inexpensive to build.

In the accompanying drawings.

Figure 4:
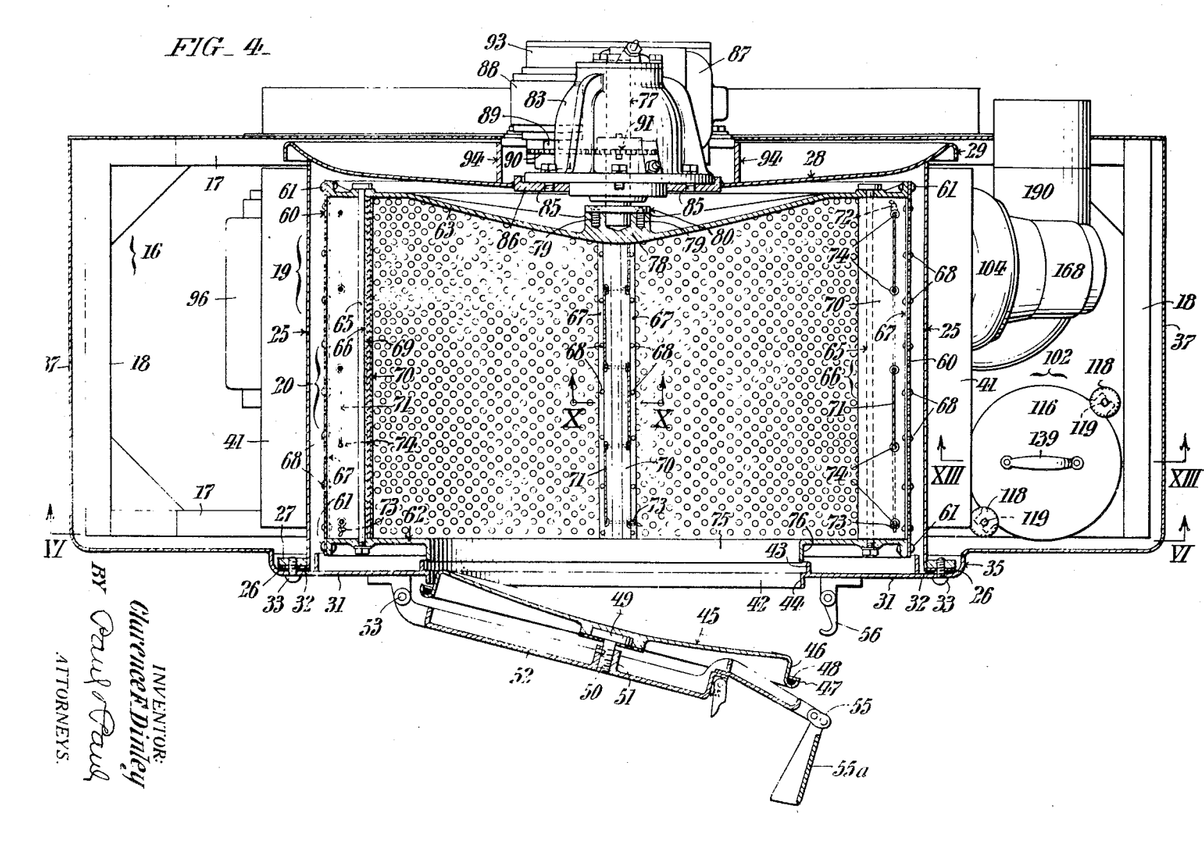
Fig. 4 is a staggered horizontal section of the machine taken as indicated by the angled-arrows IV—IV in Fig. 1.
Figures 6, 10:
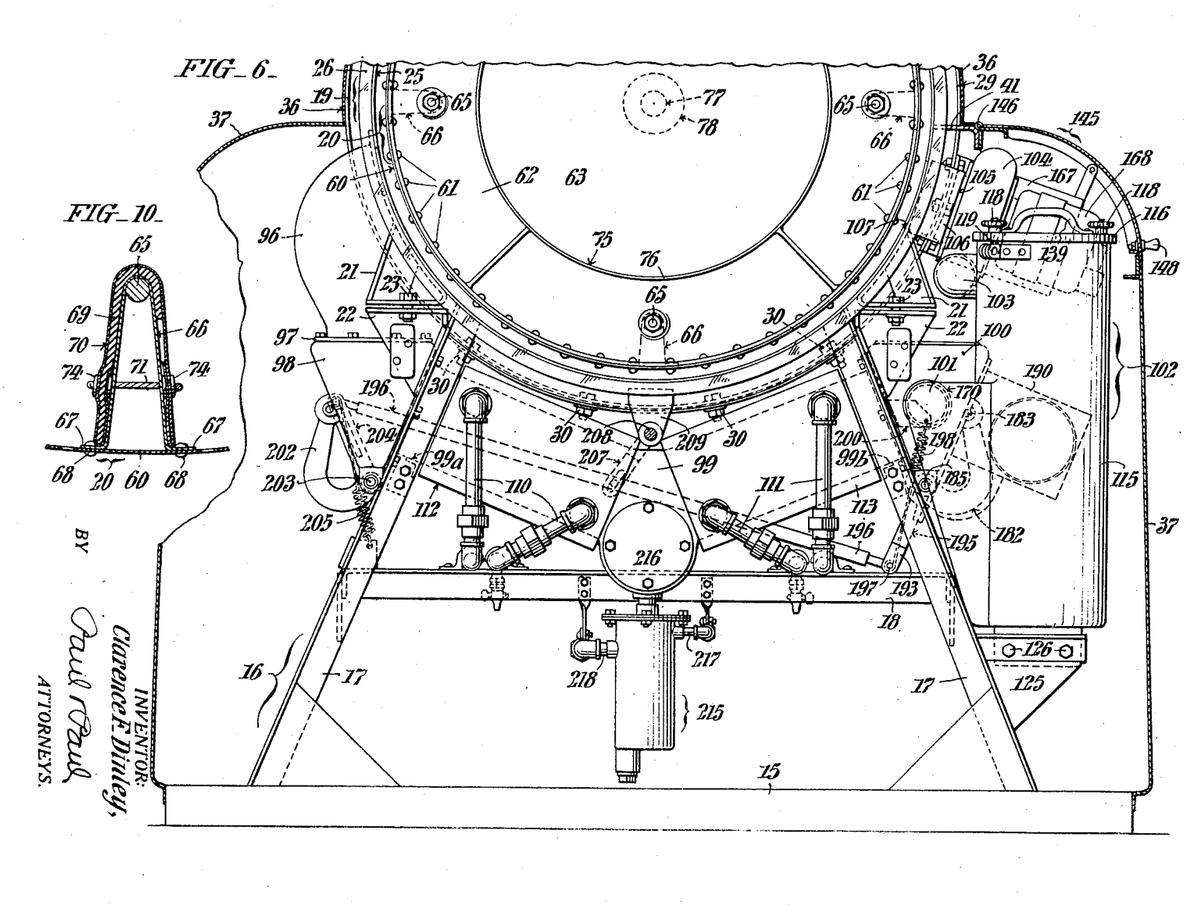
Fig. 6 is a fragmentary view in section taken as indicated by the angled-arrows VI—VI in Fig. 4.
Fig. 10 is a detail section showing the construction, taken as indicated by the angled-arrows X—X in Fig. 4.

As herein illustrated, the improved solvent recovering machine of my invention has a skeleton framework, see Fig. 6, including a base 15 and superstructure 16 with complementarily inclined legs 17 and transverse connecting bars 18. Mounted on the superstructure is a horizontal axis cylindric drum casing 19 which encloses a rotary extractor drum 20 of somewhat smaller diameter. Attached to the drum casing 19 at opposite sides are bracket projections 21 which are in vertical alignment with similar brackets 22 mounted on the superstructure 16 (Fig. 6), said bracket projections being apertured for passage of screw bolts 23 by which the drum casing 19 is secured in place. From Fig. 4 it will be observed that the drum casing 19 has an imperforate shell 25 with an outwardly projecting peripheral flange 26 and stiffening ring 27 which is welded or otherwise permanently attached to the back of said flange. At the rear, the drum casing 19 is closed by an inwardly dished discous wall 28 having a retroverted peripheral flange 29 which is secured along its bottom to the superstructure 16 of the machine framework by suitably spaced bolts shown at 30 in Figs. 6 and 9. At the front (Fig. 4) the drum casing 19 is closed by a discous face cover member 31 which with interposition of an annular gasket 32 is removably secured in place by headed screws 33 whereof the shanks threadedly engage into the flange 26 and its reinforcing ring 27. As shown, the face cover member 31 extends somewhat beyond the flange 26 all around, and is provided with a peripheral flange 35 whereof the upper half fits snugly under the front edge of a half round top component 36 of the machine housing, and whereof the lower half fits over a flange (not shown) extending about the leading edge of a circular cutout at the front end of the main component 37 of the machine housing. Screws indicated at 38 serve to secure the face cover member 31 to the machine housing at the regions of the flanges which are referred to. By means of other headed screws such as indicated at 39 in Fig. 7 passed through flanges 40 at the opposite sides of the housing component 36 into ledge members 41 projecting horizontally from the drum casing 19 at diametrically opposite points, said components are removably incorporated in the structure. As shown in Fig. 4, the face cover member 31 of the drum casing 19 has a central opening 42 with inwardly and outwardly projecting peripheral flanges 43 and 44 through which the drum is loaded in a manner later on explained. For the opening 42 I have provided a circular closure door 45 stiffened by circumferential flange 46 which latter is formed with an outward retroversion at 47 for lodgment of a ring gasket 48. When the door 45 is in closed position, the gasket 48 is compressed against the edge of the outwardly projecting flange 44 around the loading opening 42. The door 45 is supported with capacity for rotation about the head 49 of a screw stud 50 fulcrumed in the center boss 51 of a bridge bar 52 which, at one end, is hingedly connected at 53 to the outer face wall member 31 of the drum casing 19. At the opposite or swinging end of the bridge bar 52 is fulcrumed a cylindrical element 55 with an actuating grasp handle 55a adapted to cooperate with a hook latch 56 on the face wall 31 in holding the door 45 closed with the gasket 48 compressed. The door mounting just described forms no part of the present invention and need not therefore be further described herein.

Figure 5:
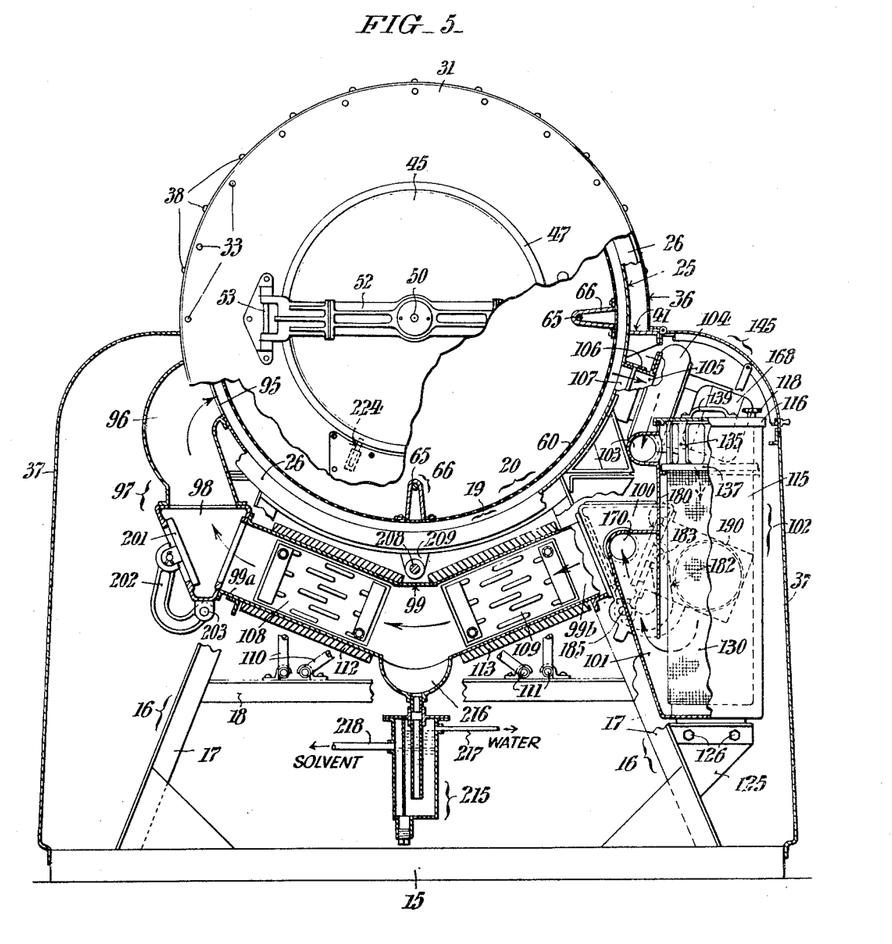
Fig. 5 is a view partly in front elevation and partly in section taken as indicated by angled-arrows V—V in Fig. 2.

The cylindric body shell 60 of the drum 20 is perforated as shown in Fig. 5, and made fast at its edges by rivets 61 to the front and the rear wall components 62 and 63 which are of cast metal. Between these front and rear wall components 62 and 63 extend tie rods 65 which are arranged at uniform intervals around said drum. Disposed over the rods 65 are lifter elements 66 in the form of strips fashioned to U-shaped cross sectional configuration from sheet metal with outwardly-extended foot flanges 67 which rest against the inner side of the shell 60 whereto they are secured by rivets indicated at 68 in Fig. 10. Over-laid upon the front sides (as considered with respect to the direction of drum rotation) and extended over the top of each lifter element 66 is a pad 69 of felt or the like which is enveloped by a hold down covering fabric strip 70, the latter being secured in place with the pad by a lacing cord 71 which is alternately passed through registering holes respectively at intervals lengthwise of the two and of the lifter as shown in Fig. 4, and knotted at opposite ends as at 72 and 73. For protection against tearing of the pad and its enveloping fabric, the lacing holes in them are preferably grommetted as indicated at 74 in Fig. 10. The construction just described precludes injury of the materials from which the solvent is to be extracted incident to being tumbled about in the drum as the latter is rotated.

The drum 20 has a circular access opening 75 in its front wall 62 surrounded by a forwardly projecting peripheral flange 76, the latter being overlapped somewhat circumferentially by the inwardly projecting peripheral flange 44 around the loading opening 42 in the face wall 31 of the drum casing 19 as shown in Fig. 4.

Figure 8:
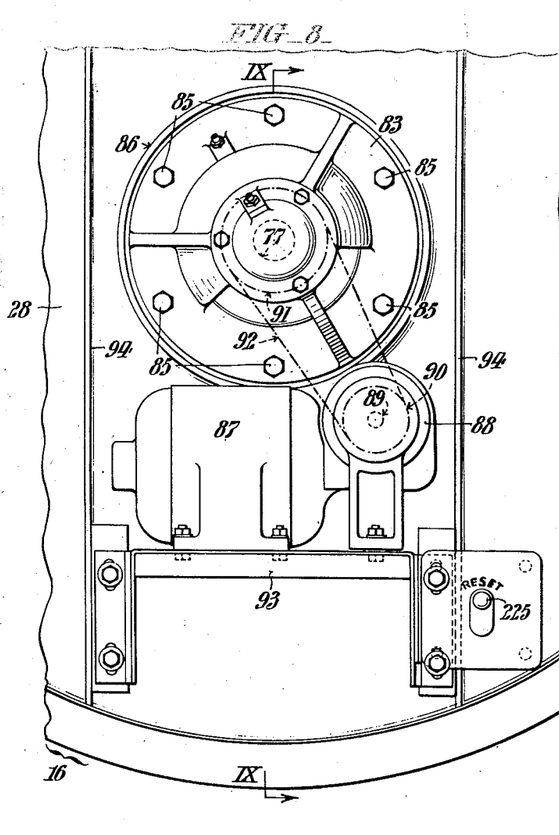
Fig. 8 is a fragmentary view in rear elevation looking as indicated by the angled-arrows VIII—VIII in Fig. 2.
Figure 9:
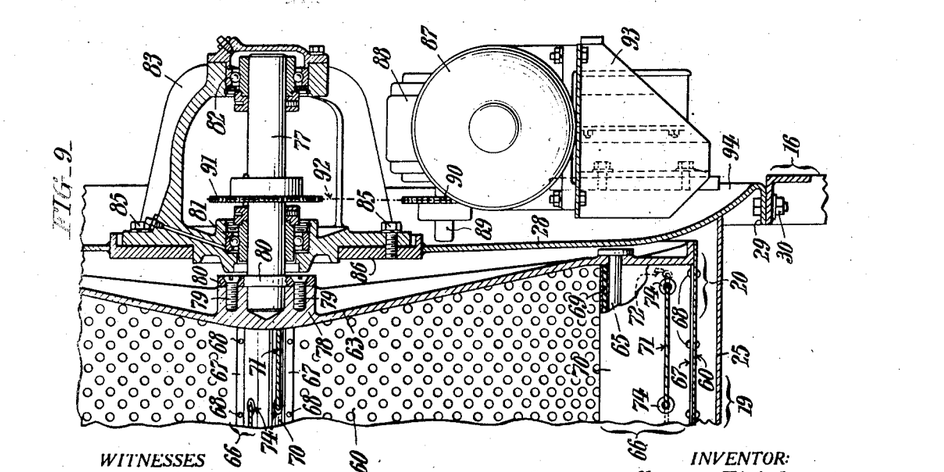
Fig. 9 is a fragmentary sectional view taken as indicated by the angled-arrows IX—IX in Fig. 8.

The drum 20 is supported by a rearwardly extending shaft 77, see Figs. 4, 8 and 9, which is socketed into a central boss 78 on the back end wall 63 of said drum and secured by headed screws 79 passed through the flange 80 thereon and threadedly engaged in said boss. The shaft 77 revolves in spaced ball bearings 81 and 82 fitted into an outboard bearing bracket 83, which, by means of screw bolts 85, is secured to a mounting plate 86 welded into a central opening in the back wall 28 of the drum casing 19. The means for driving the drum 20 includes an electric motor 87 with an incorporated speed reducing gear unit 88 whereof the outward shaft 89 carries a sprocket 90 which is connected with a similar sprocket 91 on the drum shaft 77 by a chain 92. The motor 87 is supported by a bracket 93 bolted, with capacity for up and down adjustment, to upright stiffening ribs 94 welded to the back wall of the element 28 of the drum housing.

Communicating into the drum casing 19 at the left side in Figs. 5 and 6 somewhat below the horizontal plane through its axis by way of an opening 95 in the body shell 19, is an elbow 96 and fitting 97. At the bottom, this fitting 97 connects with a damper box 98 which is in turn connected to and communicative with one end 99a of an angular tube 99 underlying said casing crosswise. The opposite complementally sloped end 99b of the tube 99 connects with another damper box 100 which, by way of a passage 101, is in communication with the bottom of a lint trap generally designated 102. Adjacent its top, the lint trap 102 is in communication, by way of a lateral passage 103, with the pressure outlet of a lateral fan blower 104 whereof the inlet 105 is connected by means of a flexible coupling tube 106 with the neck flange of an opening 107 in the body shell 25 of the drum casing 19 at the right side of the machine in Figs. 4 and 5 opposite the opening 95 previously referred to, and in substantially the horizontal plane of the latter. Disposed within end portions 99a and 99b of the tube 99 are heating and cooling radiators 108 and 109 respectively. A heating medium such as hot water or steam is circulated through the radiator 108 by way of piping indicated at 110, and cooling water through the radiator 109 by way of piping 111. As shown, the ends 99a and 99b of the tube 99 are jacketed by sheathings 112 and 113 of asbestos or the like for increasing efficiency of the heating and cooling radiators 108 and 109 respectively. The heating and cooling radiators 108 and 109 are basically similar to those described in my above identified patent and function in the same way to effect condensation or precipitation.

Figures 11, 12, 13, 14:
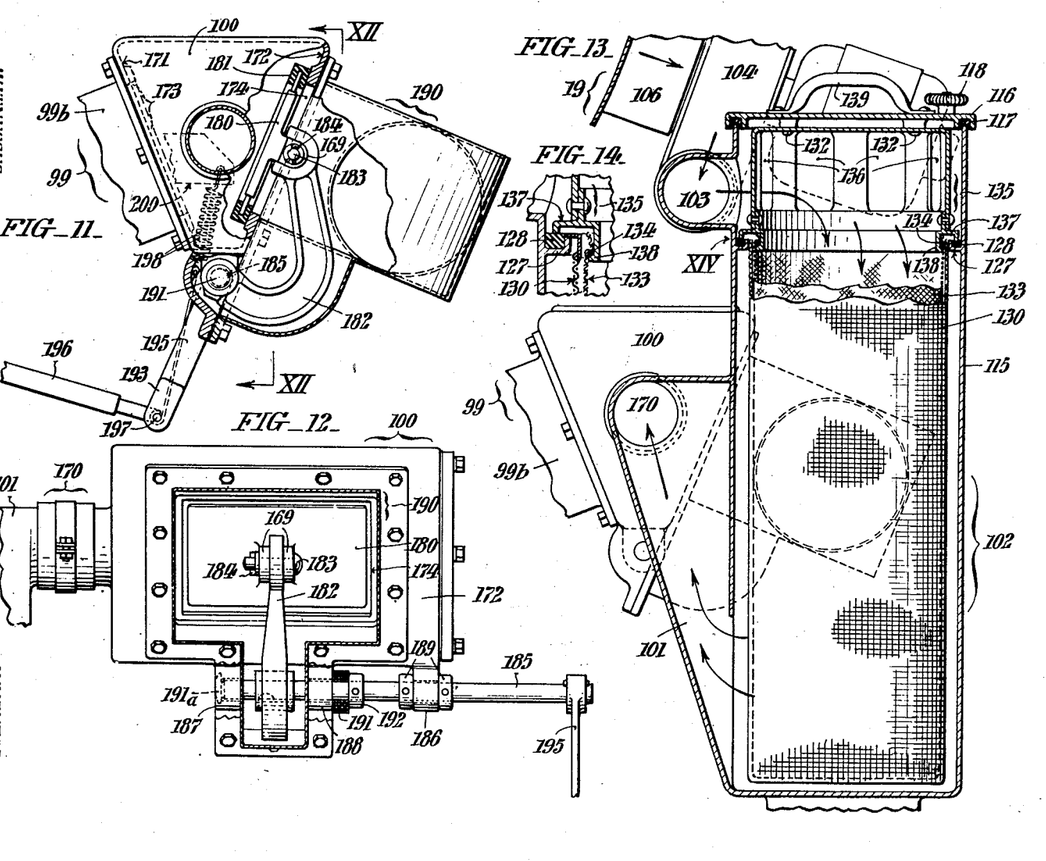
Fig. 11 is a fragmentary view partly in elevation and partly in section, taken as indicated by the angled-arrows XI—XI in Fig. 3.
Fig. 12 is a sectional view taken as indicated by the angled-arrows XII—XII in Fig. 11.
Fig. 13 is a fragmentary detail view taken as indicated by the angled-arrows XIII—XIII in Fig. 4.
Fig. 14 is a fragmentary detail view drawn to a much larger scale and showing the construction at the region XIV in Fig. 13.

The lint trap 102 is located within the right and offset portion of the main housing component 37 of the machine and is illustrated in the form of an upright cylindrical receptacle 115 having a removable lid 116, see Figs. 5, 6 and 13. A gasket 117 located in a circular groove in the underside of the lid 116 seals air-tight against the top edge of the trap body 115, said gasket being normally compressed by tightening of the nut heads 118 on swing bolts 119 by which said cover is normally held in place.

The lint trap 102 is secured at the bottom to a bracket 125 by bolts 126, and said bracket is mounted on the super structure 16. Formed on the inside wall of receptacle 115, at the upper end thereof, is an inwardly projecting annular channel 127 in which is mounted a soft gasket 128 of rubber or the like, see Figs. 13 and 14. A wire mesh bag retainer 130 is attached to the inner edge of the annular channel 127 and is suspended within the receptacle 115 in spaced relation to the side walls and bottom thereof. Suspended within the wire mesh bag retainer 130 is a removable fabric lint bag 133 which has the same general form as the wire retainer 130. The upper end of the lint bag 133 is hemmed and provided with a draw string 134 so that it can be tied onto bag holder 135 as shown in Figs. 13 and 14. The metallic bag holder 135 is cylindrical and has elongate openings 136 for the passage of an air current therethrough. It is attached to the lint trap cover 116 by rivets 132. At the lower end of the bag holder 135 is a peripheral flange 137 which seats on the gasket 128 to make an air tight joint. A second peripheral flange 138 is formed on the lower end of the bag holder 135 within the flange 137 for accommodating the draw string 134 of the lint bag 133. By tightening the nut heads 118, it will be seen that pressure is applied to soft gasket 128 under the flange 137 through the connection of the bag holder 135 to the cover 116. A handle member 139 is attached to the top of the cover 116 to facilitate its removal.

Figures 7, 15:
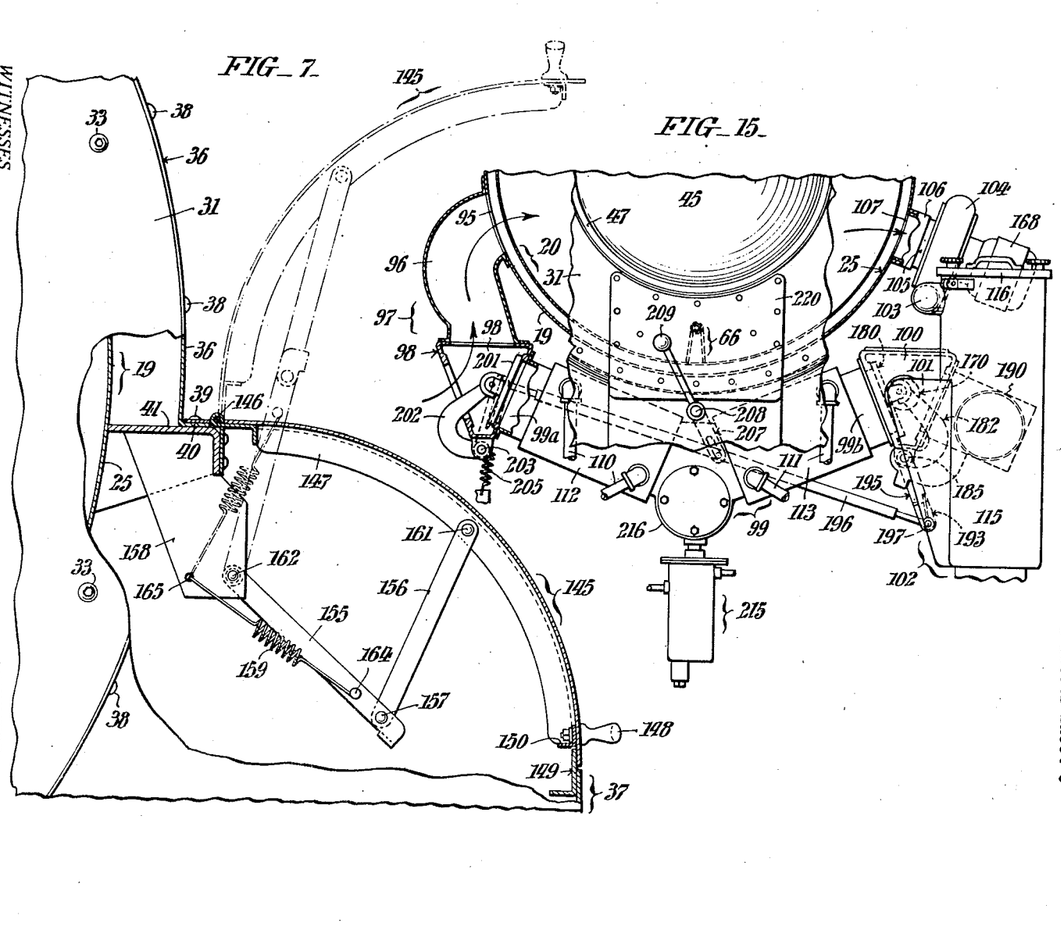
Fig. 7 is a fragmentary view partly in elevation and partly in section taken as indicated by the angled-arrows VII—VII in Fig. 3.
Fig. 15 is a fragmentary view related to Figs. 5 and 6 showing a different position of the damper mechanism.

To afford easy access to the lint trap 102, an upwardly swinging door 145 is provided in the housing component 37 as shown in Fig. 7, the door being shown in its open position in dotted lines. The door 145 is hingedly attached to ledge member 41 at 146. Strengthening ribs 147 are provided on the underside of door 145, and a handle element 148 is provided on the outside and at the lower edge of door 145. In its closed position the door 145 overlaps angle iron 149 attached to the inside of the housing component 37 as shown in Fig. 7. The door 145 is strengthened along its lower edge by angle iron 150. The levers 155 and 156 are pivotally attached to each other at 157 and to rib 147 and to bracket 158 at points 161 and 162 respectively. These levers 155 and 156 are operatively controlled by coil spring 159 in a manner readily understood so that the spring 159 positively holds door 145 closed in its closed position and open in its open position. The spring 159 is pivotally attached to lever 155 at 164 and anchored to bracket 158 at 165. The operation of this door 145 will be clear from the showing in Fig. 7.

Figure 3:
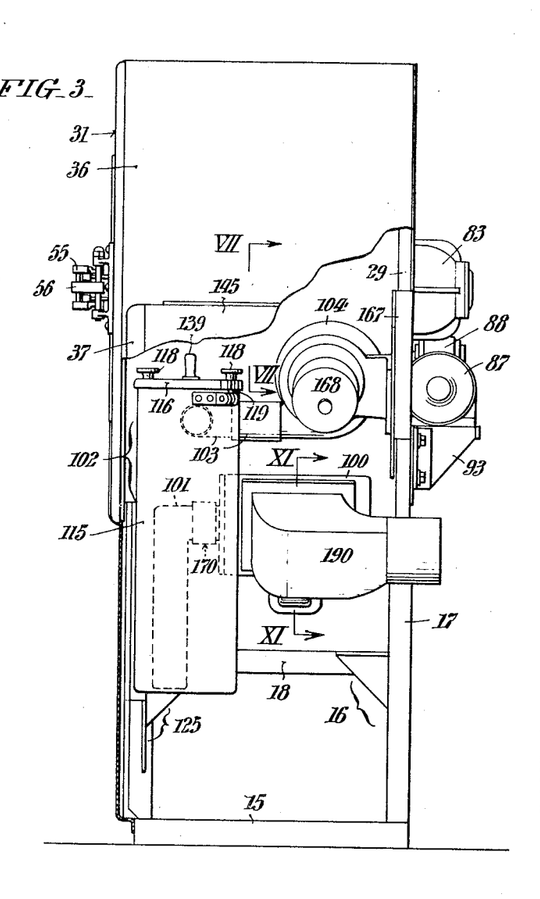
Fig. 3 is a similar illustration viewed looking toward the right of Fig. 1 with a portion of the corresponding side of its housing broken away.

The circulating fan 104 is connected at its discharge end to the lint trap 102 by a flexible conduit 103 as appears clearly in Fig. 3. The circulating fan 104 is mounted on bracket 167 which is bolted to flange 29. A drive motor 168 for fan 104 is also mounted on the bracket 167, see Fig. 6.

The discharge end 101 of the lint trap 102 is connected by a clamped flexible coupling tube 170 with damper box 100 which communicates with end 99b of tube 99. The damper box 100 (see Fig. 11) has oppositely inclined end walls 171 and 172 having rectangular openings 173 and 174 respectively therein. A damper plate 180 is provided in the damper box 100 for closing one or the other of the rectangular openings 173 and 174. A soft gasket 181 made of synthetic rubber or the like is mounted around the edges of the damper plate 180 in order to contact the inner faces of end walls 171 or 172 when operating to close the openings 173 or 174. This damper plate 180 is mounted on one end of a curved damper arm 182 by means of a pin 183 secured by a cotter pin 184 as shown clearly in Figs. 11 and 12. The pin 183 extends through holes formed in two lugs 169 mounted centrally on the plate 180 and through a hole formed in the end of the damper arm 182. It will be noted that damper plate 180 is so mounted that a small amount of play is provided to permit self adjustment for a tight closure. The damper arm 182 is mounted on operating shaft 185, keyed thereto in order to be operatively responsive to the rotation of operating shaft 185. Operating shaft 185 is mounted in bearings 186, 187 and 188 formed in the bottom portion of the damper box 100 and held in place by collars 189 mounted on the shaft 185 on each side of bearing 186. The damper arm 182 operates within outlet elbow 190 which is bolted to the outside of the end wall 172, the outlet elbow 190 being formed at the bottom thereof to accommodate the damper arm 182 as appears in Fig. 11. In order to prevent air leakage between operating shaft 185 and the bearings 187 and 188 a felt washer 191 is positioned around operating shaft 185 and held in close contact with the outside edge of the bearing 188 by a collar 192. The bearing 187 is provided to accommodate an end of the operating shaft 185 and is closed against air leakage by a plug 191a as shown in Fig. 12.

The operating shaft 185 is controlled by an operating lever 195 which, at one end thereof, is attached and keyed to said shaft. The other end of operating lever 195 is formed with a slotted yoke end 193 to which one end of adjustable tie rod 196 is pivotally connected at 197. Operating spring 198 has one end fastened to pivotal connection 197 and the other end anchored to bracket 200 mounted on frame member 16 in such fashion that the spring 198 will urge the plate 180 into closure engagement with either end wall 171 or 172 once the damper plate 180 has been moved into closure engagement with either of said walls 171 or 172.

At the end 99a of tube 99 is another damper box 98 which is similar in construction and operation to damper box 100 just described, except that no outlet elbow is provided like outlet elbow 190 attached to damper box 100. Damper box 98 also has a damper plate 201 mounted on damper arm 202, an operating shaft 203, an operating lever 204 and an operating spring 205. These elements just enumerated are the same as the elements described with reference to damper box 100 and therefore need not be further described in detail except that the operating lever 204 and operating spring 205 are positioned to operate oppositely to these same elements in damper box 100. Thus operating lever 204 extends upwardly from its pivotal connection, while operating lever 195 extends downwardly from its pivotal connection. In this way the movement of adjustable tie rod 196, which is pivotally connected at each end to operating levers 195 and 204, will cause the damper plates 180 and 201 to move in opposite directions as the adjustable tie rod 196 is moved under the control of operating lever 207 which is keyed to shaft 208 and which is pivotally connected with tie rod 196 at the central portion thereof, the shaft 208 being rotatably mounted in bracket 209 as will appear in Fig. 6. Operating lever 207 is manually controlled by a handle 209 shown in Figs. 1 and 15. Thus, if adjustable tie rod 196 is moved to the right from the position shown in Fig. 6 to the position shown in Fig. 15, it will cause damper plates 201 and 180 to swing toward each other and simultaneously close both ends 99a and 99b of tube 99 which will permit outside air to enter the circulating system through damper box 98 and be expelled from damper box 100 without passing through tube 99.

A water separator 215 is connected to the central and bottom portion of tube 99 at the bend thereof where a collecting chamber 216 is formed in the tube 99. This water separator 215 is of a conventional gravity type well known in the art and need not be described in detail here. The water is led off from the separator 215 by pipe 217, and the solvent is led off by pipe 218, see Fig. 5.

Figure 1:
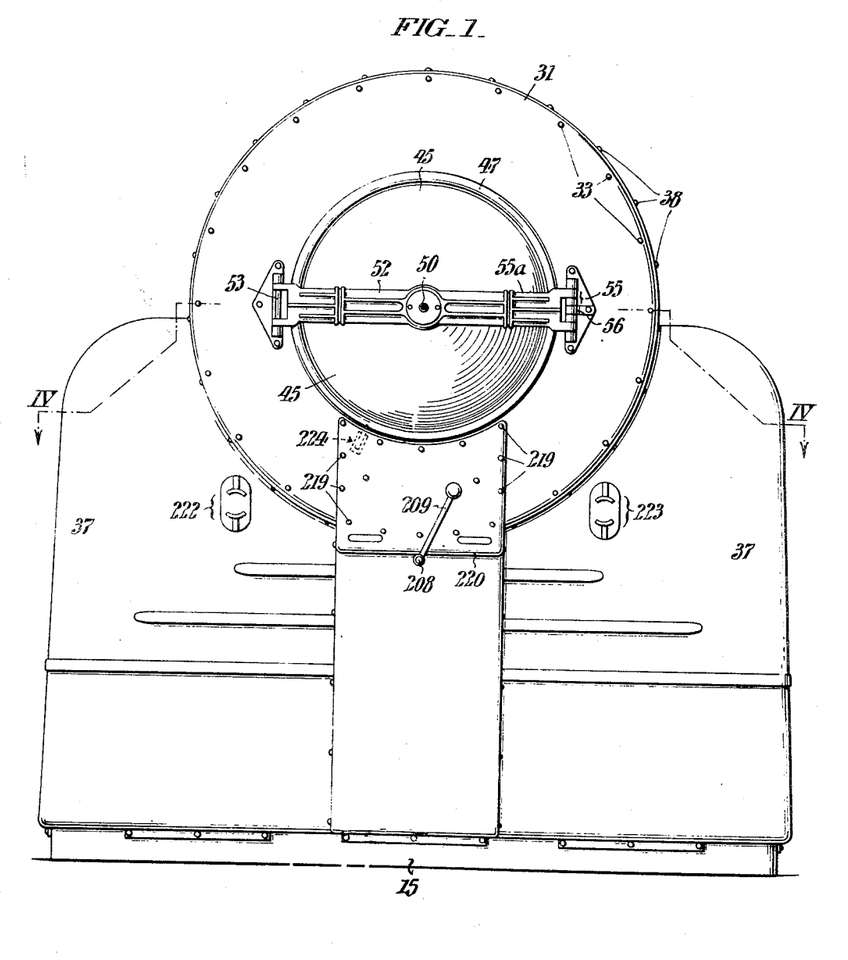
Fig. 1 shows the front elevation of a solvent recovering machine conveniently embodying the present improvements.
Figure 2:
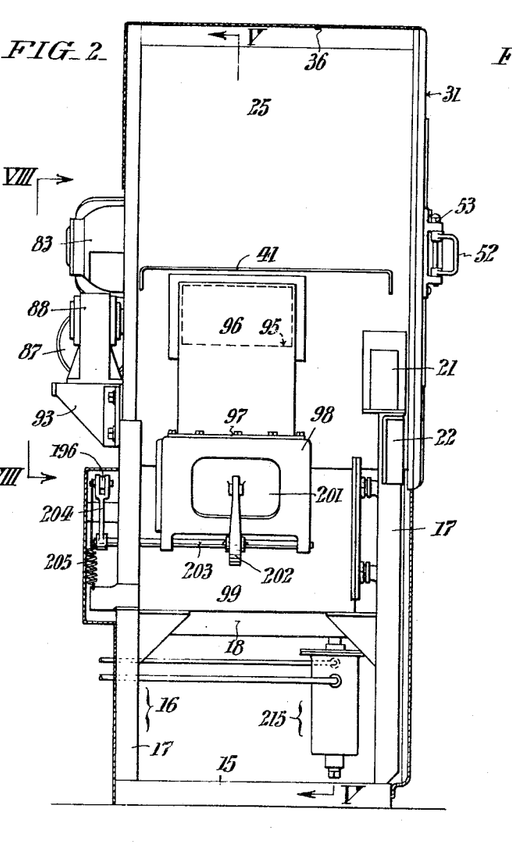
Fig. 2 is an elevation of the machine as it appears when viewed from the left of Fig. 1 with the corresponding side portion of its housing removed.

A clean-out opening is provided in the front of the apparatus, and this opening is covered by a removable cover 220 which is held in place by machine screws 219 as shown in Fig. 1. Also in Fig. 1, there are shown two tumbler switches 222 and 223 on the front face of the apparatus positioned on each side of the clean-out cover 220. The tumbler switch 223 controls motor 87 which rotates the drum 20. The tumbler switch 222 controls the operation of the fan motor 168 which rotates the circulating fan 104. A switch 224 is provided at the bottom edge of door 45 as shown in Figs. 1 and 5 and connected electrically in the circuit controlling the operation of motor 87 by which drum 20 is rotated. The actuating arm of door switch 224 engages the lower edge of door 45 when the latter is in the closed position and by this engagement the circuit through the switch 224 is closed. When the door 45 is in the open position, door switch 224 is opened and the rotating drum 20 cannot be started as long as the door is open.

The circuits to both the motor 87 and motor 168 are both wired through an overload protection means of a type well-known to the art, and a reset button 225 is provided for this overload means as shown in Fig. 8 to reset the device after either motor has cooled to a sufficient degree for safe operation.

The operation of the apparatus is generally similar to that of the apparatus described in my above identified patent. In describing this operation, it will be assumed that condensing water and steam of suitable temperature and pressure have been supplied to the cooling and heating radiators 109 and 108 respectively, and that a batch of some 20 lbs. of dry clothing that has been cleaned has been placed in the drum 20, and the door 45 is closed. The damper plates 180 and 201 are then positioned as shown in Fig. 5 by means of the damper operating handle 209. The air is then circulated by fan 104 which is controlled by tumbler switch 222, causing the air to circulate in a closed circuit through the heating radiator 108, the goods in the drum 20, the lint filter 102, and the cooling radiator 109. Issuing from the heater 108, the air warms up the goods and vaporizes solvent in them to an amount approaching saturation at the temperature of the air. The suction of the fan 104 is directly connected to the treating chamber in which drum 20 rotates and therefore loses none of its effectiveness as is the case when placed at some other point in the circulating system. Further, the discharge of the fan 104 is immediately connected to the lint filter 102 which directs the full and undiminished force of the discharge current immediately into the lint filter 102. It has been found that this particular positioning of the circulating fan 104 is very advantageous to the more efficient operation of this apparatus.

Passing through the filter 102 which removes all lint picked up by the air from the goods and through the cooling radiator 109, the air is chilled by the cooling radiator 109 and the solvent vapor therein is condensed and runs down into the water and solvent separator 215 to be separated so that the water is drawn off through pipe 217 and the solvent through pipe 218. It should be noted here that due to the particular shape of the bent tube 99 and the positioning of the collecting chamber 216 at the bottom of the bend in the tube 99, it is possible for drainage to flow from both of the inclined portions of tube 99. As the circulating air leaves the cooling radiator 109, it carries with it a residue of the solvent which condenses in the front part of that portion of tube 99 housing the heating radiator 108. Thus cooled and relatively free of solvent, the air is again reheated in the heating radiator for a repetition of the cycle. If the residue of solvent carried into the portion of the tube 99 housing the heating radiator 108 were not drained off promptly, it would be heated, volatilized and again condensed by cooling radiator 109 resulting in a great loss in efficiency of operation.

As soon as the maximum recovery of the solvent has been reached, the damper controlling handle 209 is operated to swing the damper plates 201 and 180 to the position of Fig. 15 at which both ends 99a and 99b of the tube 99 are closed and fresh air is introduced into the rest of the circulating system through damper box 98 to be circulated through the clothes in the drum 20, passed through the lint separator 102 and discharged from the circulating system through damper box 100 and its outlet elbow 190. Under these conditions, unheated outside air will be blown through the clothes in drum 20 removing all susceptible traces of solvent odor within a minute in most cases. At the same time, air circulation through the tube 99 due to the chimney effect of the heating radiator (or in reverse, of the cooling radiator 109) will be prevented by the damper plates 180 and 201 which effectively close off the tube 99 from the open air and thereby prevent reevaporation and loss of condensate on the cooling surface of the cooling radiator 109. Thereupon the motor 87 and the fan 104 and the drum 20 are stopped, the door 45 opened and the clothes, which are now completely free of all odor, removed from the apparatus.

A modified form of this apparatus might include a solenoid to automatically operate the damper mechanism by the use of a motor driven sequence timer with which the machine might be started after the clothes to be processed have been placed within it and the loading door closed. The timer then could be arranged to time the solvent recovery cycle and after the solvent recovery period, operate the damper mechanism through the solenoid, timing the deodorizing period and at the end of the cycle returning the damper mechanism to the solvent recovery position and stopping both the fan and the tub drive. The machine could then be unloaded manually, again reloaded and started manually by the operator.

From the above description it will be apparent that the apparatus herein described is characterized by a simplicity of construction and efficiency of operation due to the particular arrangement of the elements involved in the system of air circulation. Reference is made to my patent identified above for further operational detail, particularly in regard to temperature conditions.

While the preferred embodiments and suggested modifications thereof have been described in some detail, it will be apparent to one skilled in the art that various changes and variations may be made therein without departing from the spirit of the invention as hereinafter claimed.

Having thus described my invention, I claim:

1. In apparatus of the character described for recovering volatile solvents from material that has been treated therewith, a treating chamber having an access door, a rotating perforated tumbling drum for the material within said treating chamber, a rotary fan connected on its suction side directly to said treating chamber, a lint filter having its intake directly connected to the discharge side of said fan, a tube having oppositely and upwardly inclined end portions, a cooling radiator in one of said inclined end portions, a heating radiator in the other of said inclined end portions of said tube, a separator attached to the central and bottom portion of said tube between the said cooling and heating radiators, a damper box connecting said lint filter to one end of said tube and another damper box connected to the other end of said tube and leading into said treating chamber, movable damper plates adapted to close the ends of said tube and to open the damper boxes to the outside air when in one position and, when in another position, to close said damper boxes to the outside air and to open the ends of said tube, and means for moving said dampers simultaneously from one position to the other.

2. Solvent recovery apparatus according to claim 1, further including a surrounding housing with a door affording access to the lint trap.

3. In apparatus for recovering volatile solvents from material that has been treated therewith, a horizontal axis cylindric treating chamber with an access door; a perforate rotary tumbling drum for the material within the chamber; an external air flow conduit extending around the bottom of the chamber between an inlet opening and an outlet opening respectively at opposite sides of the chamber substantially at the level of its axis, said conduit having a central section with end portions which are oppositely inclined upwardly; a circulating fan and a lint filter interposed between the central section of the conduit at the air outlet opening of the chamber; a condensate collecting trap connected to the central section of the conduit at its lowest point; a solvent vapor condenser within that end portion of the central conduit section connected to the fan and the lint filter; and a heating means within the other end portion of said central conduit section.

4. Solvent recovery apparatus according to claim 3, further including damper valve boxes in the conduit, one interposed between the fan and one end of the central section of the conduit containing the condenser and the other box between the other end of said section and the air inlet opening of the chamber, said boxes having ports respectively in communication with the opposite ends of said central section of the conduit and the outside atmosphere; a damper valve within each box movable between the two ports thereof and normally closed over that port which is in communication with the outside atmosphere; and means for actuating the two valves as and for the purpose set forth.

5. Solvent recovery apparatus according to claim 3, further including damper valve boxes in the conduit, one interposed between the fan and one end of the central section of the conduit containing the condenser, and the other box interposed between the other end of the central conduit section and the air inlet opening of the chamber, said boxes having ports respectively in communication with the opposite ends of said central conduit section and the outside atmosphere; a damper valve within each box movable between the two ports thereof and normally closed over the port which is in communication with the outside atmosphere; and means for actuating the two valves as and for the purpose set forth.

6. Solvent recovery apparatus according to claim 3, further including damper valve boxes in the conduit, one interposed between the fan and one end of the central section of the conduit containing the condenser, and the other box interposed between the other end of the central conduit section and the air inlet opening of the chamber, said boxes being triangular in shape with oppositely inclined sides having ports respectively in communication with the opposite ends of said central conduit section; a damper plate in each valve box pivoted at the vortex between the oppositely inclined sides of such box for movement between said ports; and means for actuating the two valves as and for the purpose set forth.

7. Solvent recovery apparatus according to claim 3, further including a casing with a semi-cylindric upper section extending over the chamber, and a flat walled lower section below the level of the chamber axis with flanking portions extending beyond opposite sides of said chamber, by which the air flow conduit, the fan, and the lint filter are enclosed.

8. Solvent recovery apparatus according to claim 3, further including a casing with a semi-cylindric upper section extending over the chamber, and a lower section below the level of the chamber axis with flanking portions extending beyond opposite sides of said chamber, by which the air flow conduit, the fan, the lint filter are enclosed, said lower casing section having an opening in the top of one of its flanking ends thereof through which access may be had to the fan and the lint filter, and a retractable closure for said opening.

CLARENCE F. DINLEY.

REFERENCES CITED

The following references are of record in the file of this patent:

UNITED STATES PATENTS

| Number | Name | Date |
|---|---|---|
| 1,059,820 | Besemfelder | Apr. 22, 1913 |
| 1,141,705 | Grosvenor | June 1, 1915 |
| 1,522,553 | Taylor | Jan. 13, 1925 |
| 1,786,191 | Carroll | Dec. 23, 1930 |
| 1,792,137 | Bethke | Feb. 10, 1931 |
| 2,019,011 | Johnson | Oct. 29, 1935 |
| 2,026,189 | Purkett | Dec. 31, 1935 |
| 2,097,124 | Kelsey | Oct. 26, 1937 |
| 2,293,432 | Friedman | Aug. 18, 1942 |
| 2,301,803 | Davis | Nov. 10, 1942 |
| 2,310,680 | Dinley | Feb. 9, 1943 |
| 2,328,256 | Breckenbridge | Aug. 31, 1943 |
| 2,344,135 | Downes | Mar. 14, 1944 |
| 2,389,433 | Hough | Nov. 20, 1945 |
| 2,397,091 | Davis | Mar. 26, 1946 |
| 2,403,416 | Vandegriff | July 2, 1946 |
| 2,434,886 | Pugh | Jan. 20, 1948 |